(12) United States Patent
Miyazaki

(10) Patent No.: US 8,897,567 B2
(45) Date of Patent: Nov. 25, 2014

(54) INFORMATION PROCESSOR, DEVICE, AND INFORMATION PROCESSING SYSTEM

(75) Inventor: Yoshio Miyazaki, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 375 days.

(21) Appl. No.: 13/157,591

(22) Filed: Jun. 10, 2011

(65) Prior Publication Data

US 2011/0306419 A1 Dec. 15, 2011

(30) Foreign Application Priority Data

Jun. 14, 2010 (JP) ................................ 2010-135345
Jun. 14, 2010 (JP) ................................ 2010-135346

(51) Int. Cl.
*G06K 9/46* (2006.01)
*G06K 9/66* (2006.01)
*G06F 3/03* (2006.01)

(52) U.S. Cl.
CPC .................................. *G06F 3/0304* (2013.01)
USPC .............. 382/190; 382/153; 382/313; 463/37

(58) Field of Classification Search
USPC ......... 382/153, 167, 190, 313; 463/36, 37, 44
See application file for complete search history.

(56) References Cited

U.S. PATENT DOCUMENTS

| | | | |
|---|---|---|---|
| 6,697,116 B1* | 2/2004 | Kurokawa et al. | 348/371 |
| 8,463,317 B2* | 6/2013 | Lee et al. | 455/550.1 |
| 2006/0250668 A1* | 11/2006 | Komiya et al. | 358/504 |
| 2007/0008067 A1* | 1/2007 | Suzuki | 340/5.64 |
| 2007/0099706 A1* | 5/2007 | Nuta et al. | 463/44 |
| 2008/0309164 A1* | 12/2008 | Lim | 307/39 |
| 2009/0231607 A1 | 9/2009 | Kurashina | |
| 2010/0309102 A1* | 12/2010 | Jung | 345/82 |
| 2011/0063295 A1* | 3/2011 | Kuo et al. | 345/426 |
| 2011/0065509 A1* | 3/2011 | Rom et al. | 463/37 |
| 2011/0306419 A1* | 12/2011 | Miyazaki | 463/36 |

FOREIGN PATENT DOCUMENTS

| | | |
|---|---|---|
| CN | 101180599 | 5/2008 |
| JP | 7-244557 | 9/1995 |
| JP | 10-269016 | 10/1998 |
| JP | 2009-217662 | 9/2009 |
| JP | 2010-123087 | 6/2010 |
| WO | 2007/116578 | 10/2007 |
| WO | 2008/120189 | 10/2008 |
| WO | 2010/055737 | 5/2010 |

OTHER PUBLICATIONS

Notification of Reason(s) for Refusal dated Jun. 19, 2012, from corresponding Japanese Application No. 2010-135345.

(Continued)

*Primary Examiner* — Gregory M Desire
(74) *Attorney, Agent, or Firm* — Katten Muchin Rosenman LLP

(57) ABSTRACT

A color determination unit determines color information of a light-emitting body of an input device. A transmitter unit communicates the determined color information to the input device. A recording unit records a history of the color information determined by the color determination unit. A color candidate determination unit determines one or more candidates of emitted color of the light-emitting body, using the color information recorded in the recording unit. An acknowledging unit acknowledges from the user a command to determine a candidate of emitted light, and the color determination unit determines the color information of the light-emitting body accordingly.

11 Claims, 7 Drawing Sheets

(56) References Cited

OTHER PUBLICATIONS

Chinese First Office Action dated Aug. 8, 2013, from corresponding Chinese Application No. 201110158604.5.
Notification of Reasons for Refusal dated Feb. 4, 2014, from corresponding Japanese Application No. 2012-143019.

Chinese Office Action dated Apr. 14, 2014 from corresponding Application No. 201110158604.5.
Notification of Reason for Refusal, dated Sep. 2, 2014 from corresponding Japanese Application No. 2012-143019.

* cited by examiner

20

20

INFORMATION PROCESSOR, DEVICE, AND INFORMATION PROCESSING SYSTEM

BACKGROUND OF THE INVENTION

1. Field of the Invention

The present invention relates to information processing technology and, more particularly, to a technology of determining the emitted color of a device provided with a light-emitting body.

2. Description of the Related Art

There is proposed a technology whereby a controller transmits data of the appearance color data to a game device and the game device maps the appearance color of the controller into the character color (see patent document No. 1). Recently, wireless game controllers are commonly used as an input device for a game. Technologies are proposed whereby, in addition to using the traditional button input, an image of a device manipulated by a user is captured by a camera so that the motion of the device as captured in the image is used as an input to the game.

[patent document No. 1] JP 10-269016

SUMMARY OF THE INVENTION

We have found possibilities of enabling various applications by using an input device provided with a light-emitting body in which the emitted color is configurable as desired. The emitted color may be configured by the user as desired. It is preferable to recognize a light-emitting body in a captured image with high precision if the motion of the light-emitting body is used as an input to the game. Meanwhile, the user often desires to cause the light-emitting body to emit light of the user's favorite color. Capabilities of automatically configuring the emitted color to suit the user's preference will allow the user to enjoy running the application.

In this background, a general purpose of the present invention is to provide a technology of properly configuring an emitted color of a light-emitting body provided in a device.

The information processing device that addresses the issue comprises: a color determination unit configured to determine color information of a light-emitting body of an input device; a communication unit configured to communicate the determined color information to the input device; an acquisition unit configured to acquire a captured image of the input device; an image processing unit configured to extract an image of the light-emitting body from the captured image of the input device; and a recording unit configured to record the color information determined by the color determination unit.

Another embodiment of the present invention relates to a device. The device comprises: a light-emitting body; a light-emission control unit configured to control light emission of the light-emitting body; a color determination unit configured to determine color information of the light-emitting body; and a recording unit configured to record a history of the determined color information. The color determination unit determines the color information of the light-emitting body, using the color information recorded in the recording unit.

Still another embodiment of the present invention relates to an information processing system provided with an information processing device and an input device. The input device comprises: a light-emitting body; and a light-emission control unit configured to control light emission of the light-emitting body, wherein the information processing device comprises: a color determination unit configured to determine color information of a light-emitting body of an input device; a communication unit configured to communicate the determined color information to the input device; and a recording unit configured to record the color information determined by the color determination unit. The color determination unit determines the color information of the light-emitting body, using the color information recorded in the recording unit.

Optional combinations of the aforementioned constituting elements, and implementations of the invention in the form of methods, apparatuses, systems, recording mediums and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
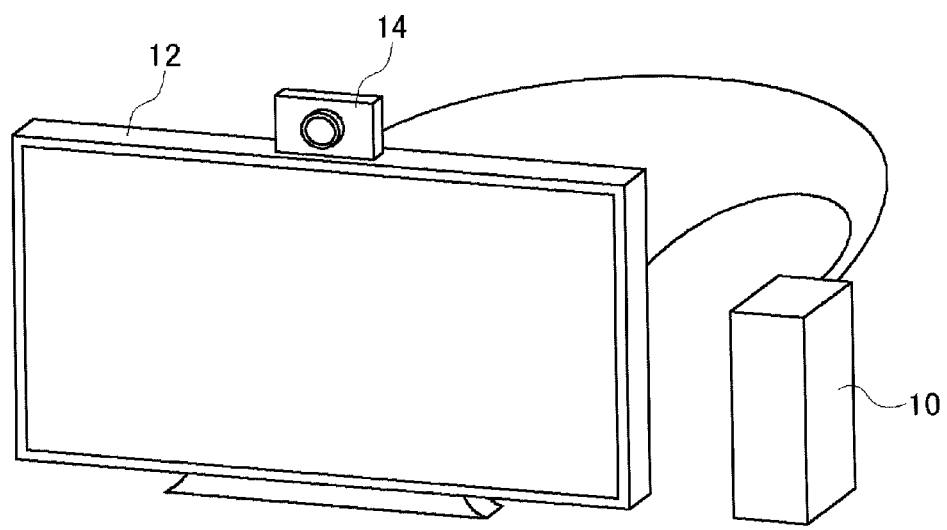
FIG. 1 shows an environment in which an information processing system according to an embodiment of the present invention is used.
Figure 1:
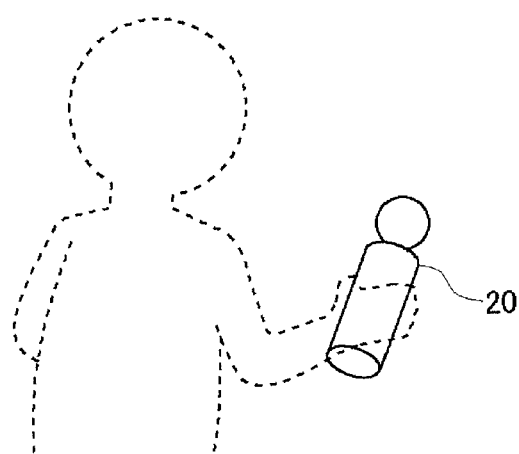

FIG. 1 shows an environment in which an information processing system 1 according to an embodiment of the present invention is used. The information processing system 1 comprises a game device 10 that runs game software, a display device 12 that outputs a result of processing by the game device 10, an input device 20, and an imaging device 14 that images the input device 20.

The input device 20 is a user input device that allows a user to provide a command. The game device 10 is an information processing device that runs a game program in accordance with a user command provided via the input device 20 and generates an image signal indicating a result of game processing.

The input device 20 has the function of transferring a user command to the game device 10 and is configured according to the embodiment as a wireless controller capable communicating with the game device 10 wirelessly. The input device 20 and the game device 10 may establish wireless connection using the Bluetooth (registered trademark) protocol. The input device 20 may not be a wireless controller but may be connected to the game device 10 using a cable.

The input device 20 is driven by a battery and is provided with multiple buttons for providing a user command to advance the game. As the user operates the button of the input device 20, the user command is transmitted to the game device 10 wirelessly. The game device 10 receives the user command from the input device 20, controls the progress of the game in accordance with the user command, and generates a game image signal. The generated game image signal is output from the display device 12.

The imaging device 14 is a video camera comprising a CCD imaging device, a CMOS imaging device, or the like. The imaging device 14 captures an image of a real space at predetermined intervals so as to generate frame images for the respective intervals. For example, the imaging device 14 may capture 30 images per second to match the frame rate of the display device 12. The imaging device 14 is connected to the game device 10 via a universal serial bus (USB) or another interface.

The display device 12 is a display that outputs an image and displays a game screen by receiving an image signal generated by the game device 10. The display device 12 may be a television set provided with a display and a speaker. Alternatively, the display device 12 may be a computer display. The display device 12 may be connected to the game device 10 using a cable. Alternatively, the display device 12 may be wirelessly connected using a wireless local area network (LAN).

The input device 20 in the information processing system 1 is provided with a light-emitting body. During the game, the light-emitting body emits light, which is imaged by the imaging device 14. The imaging device 14 captures an image of the input device 20 and generates a frame image and supplies it to the game device 10. The game device 10 acquires the frame image and derives information on the position of the light-emitting body in the real space in accordance with the position and size of the image of the light-emitting body in the frame image. The game device 10 deals the positional information as a command to control the game and reflects the information in game processing by, for example, controlling the action of a player's character. The game device 10 according to the embodiment is provided with the function of running a game program not only using a user input via the button of the input device 20 but also using the positional information of the acquired image of the light-emitting body.

The light-emitting body of the input device 20 is configured to emit light of multiple colors. The color emitted by the light-emitting body can be configured according to color information designated by the game device 10. Alternatively, the emitted color of the light-emitting body may be configured according to color information designated by an internal circuit of the input device 20.

The input device 20 is provided with an acceleration sensor and a gyro sensor. The value detected by the sensor is transmitted to the game device 10 at predetermined intervals. The game device 10 acquires the detected value and acquires information on the orientation of the input device 20 in the real space. The game device 10 deals the orientation information as a user command in the game and reflects the information in game processing. Thus, the game device 10 according to the embodiment has the function of running a game program using the acquired orientation information of the input device 20.

The game device 10 is shown in this embodiment as an example of information processing device. However, the information processing device may run other application software.

Figure 2A:
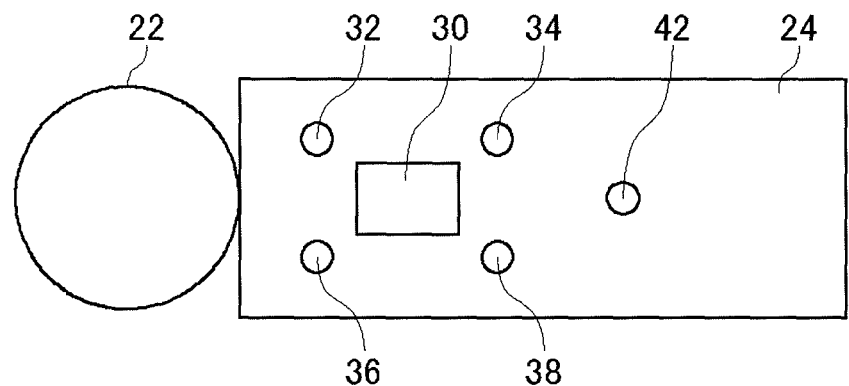
FIGS. 2A and 2B show the appearance of an input device.
Figure 2B:
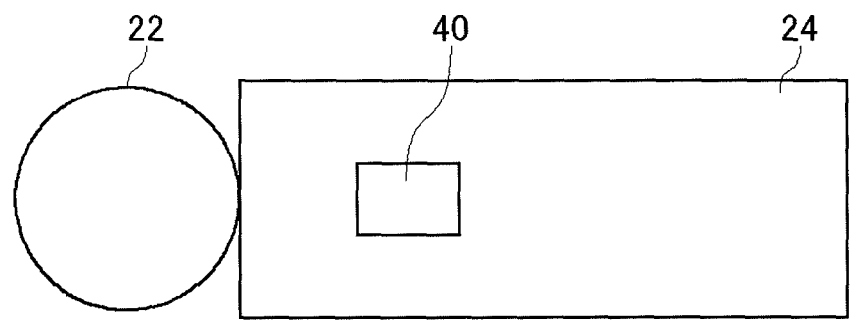

FIGS. 2A and 2B show the appearance of the input device 20. FIG. 2A shows the top surface of the input device 20, and FIG. 2B shows the bottom surface of the input device 20. The input device 20 comprises a light-emitting body 22 and a cylindrical main body 24. The exterior of the light-emitting body 22 is formed of a light-transmitting resin to have a spherical form. The light-emitting body 22 is provided with a light-emitting device such as a light-emitting diode or an electric bulb inside. When the light-emitting device inside emits light, the entirety of the exterior sphere is lighted.

Control buttons 30, 32, 34, 36, and 38, and a start button 42 are provided on the top surface of the main body 24, and a control button 40 is provided on the bottom surface. The control buttons 30, 32, 34, 36, and 38 are controlled by the thumb of the user holding the ends of the main body 24 with the hands. The control button 40 is controlled by the index finger. The control buttons 30, 32, 34, 36, and 38, and the start button 42 are configured such that the buttons can be pressed. The control button 40 may be rotatable.

The user plays the game viewing the game screen displayed on the display device 12. Because it is necessary to capture an image of the light-emitting body 22 while the game software is being run, the imaging device 14 is preferably oriented to face the same direction as the display device 12. Typically, the user plays the game in front of the display device 12. Therefore, the imaging device 14 is arranged such that the direction of the light axis thereof is aligned with the frontward direction of the display device 12. More specifically, the imaging device 14 is preferably located in the neighborhood of the display device 12 to include in its imaging range those positions where the user can view the display screen of the display device 12. This allows the imaging device 14 to capture an image of the input device 20.

Figure 3:
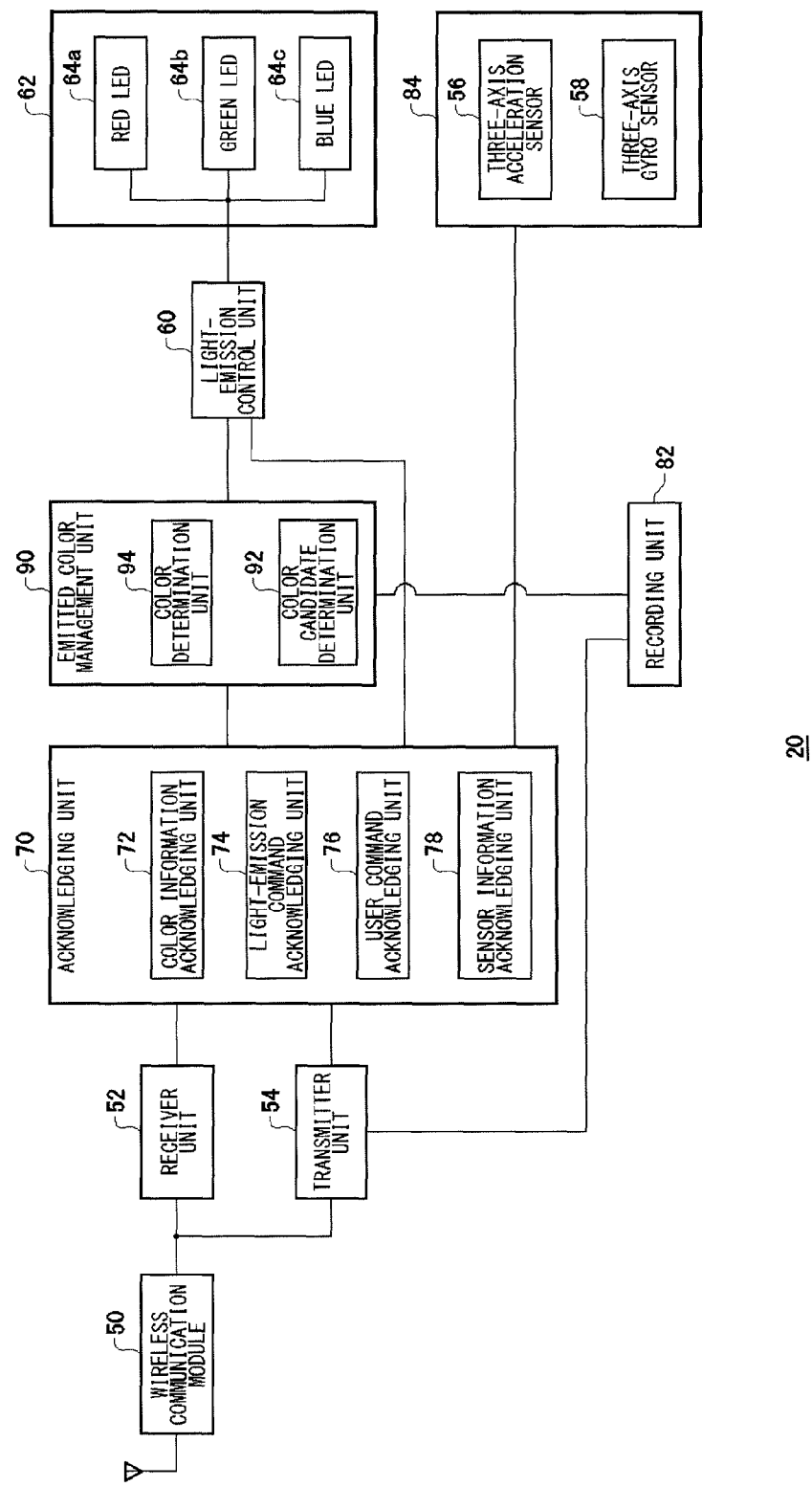
FIG. 3 shows the configuration of the input device.

FIG. 3 shows the configuration of the input device 20. The input device 20 comprises a wireless communication module 50, a receiver unit 52, a transmitter unit 54, a light-emission control unit 60, a light-emitting unit 62, an acknowledging unit 70, a recording unit 82, a sensor 84 and an emitted color management unit 90. The acknowledging unit 70 comprises a color information acknowledging unit 72, a light-emission command acknowledging unit 74, a user command acknowledging unit 76 and a sensor information acknowledging unit 78. The emitted color management unit 90 comprises a color candidate determination unit 92 and a color determination unit 94. The sensor 84 comprises a three-axis acceleration sensor 56 and a three-axis gyro sensor 58. The wireless communication module 50 has the function of transmitting and receiving data to and from the wireless communication module of the game device 10. The wireless communication module 50 may be configured to include the receiver unit 52 and the transmitter unit 54.

The functions of the input device 20 are implemented, in hardware components, by any CPU of a computer, a memory, and a program or the like loaded into the memory. FIG. 3 depicts functional blocks implemented by the cooperation of hardware and software. Therefore, it will be obvious to those skilled in the art that the functional blocks may be implemented in a variety of manners by hardware only, software only, or a combination of thereof.

The recording unit 82 is a non-volatile memory and stores device information of the input device 20. The device information includes a device identification number identifying the input device 20, and color information of the main body 24 of the input device 20. The device information is stored in the recording unit 82 when the input device 20 is shipped. The color information of the main body 24 may be RGB information identifying the casing color of the main body 24. When the input device 20 establishes wireless connection with the game device 10, the transmitter unit 54 transmits the device information stored in the recording unit 82 from the wireless communication module 50 to the game device 10.

The three-axis acceleration sensor 56 detects acceleration components in three directions defined by X, Y and Z axes. The three-axis gyro sensor detects angular velocity on the XZ plane, ZY plane and YX plane. The sensor information acknowledging unit 78 acknowledges information on detected values from the three-axis acceleration sensor 56 and the three-axis gyro sensor 58, and sends the information to the transmitter unit 54. The user command acknowledging unit 76 acknowledges input information from the control buttons 30, 32, 34, 36, 38, and 40 and the start button 42 and sends the information to the transmitter unit 54. Along with the input information from the control buttons, the transmitter unit 54 sends information on the value detected by the three-axis acceleration sensor 56 and information on the value detected by the three-axis gyro sensor 58 via the wireless communication module 50 to the wireless communication module of the game device 10 at predetermined intervals. The interval of transmission is set to, for example, 11.25 milliseconds.

The receiver unit 52 receives a signal transmitted from the game device 10 via the wireless communication module 50, and delivers the signal to the acknowledging unit 70. The game device 10 transmits color information identifying the color emitted by the light-emitting body 22 as well as transmitting other commands. Upon receiving the transmitted color information, the color information acknowledging unit 72 delivers the information to the emitted color management unit 90.

The emitted color management unit 90 determines the color emitted by the light-emitting unit 62 or facilitates the determination. The color candidate determination unit 92 determines candidates of emitted color. For example, the color candidate determination unit 92 determines candidates of emitted color, excluding colors found in the environment included in the captured image. The color determination unit 94 determines the color emitted by the light-emitting body 22 by referring to the candidates of emitted color determined by the color candidate determination unit 92. The recording unit 82 records the color information determined by the color determination unit 94. The color candidate determination unit 92 and the color determination unit 94 may determine the candidates of emitted color and the emitted color, respectively, by referring to the history of color information recorded in the recording unit 82.

The light-emission control unit 60 controls light emission from the light-emitting unit 62. For example, the unit 60 controls the color tone or timing of lighting the light-emitting unit 62. The light-emitting unit 62 comprises a red LED 64a, a green LED 64b, a blue LED 64c and is capable of emitting light of multiple colors. The light-emission control unit 60 controls light-emission from the red LED 64a, green LED 64b, blue LED 64c in accordance with the color information determined by the color determination unit 94.

Figure 4:
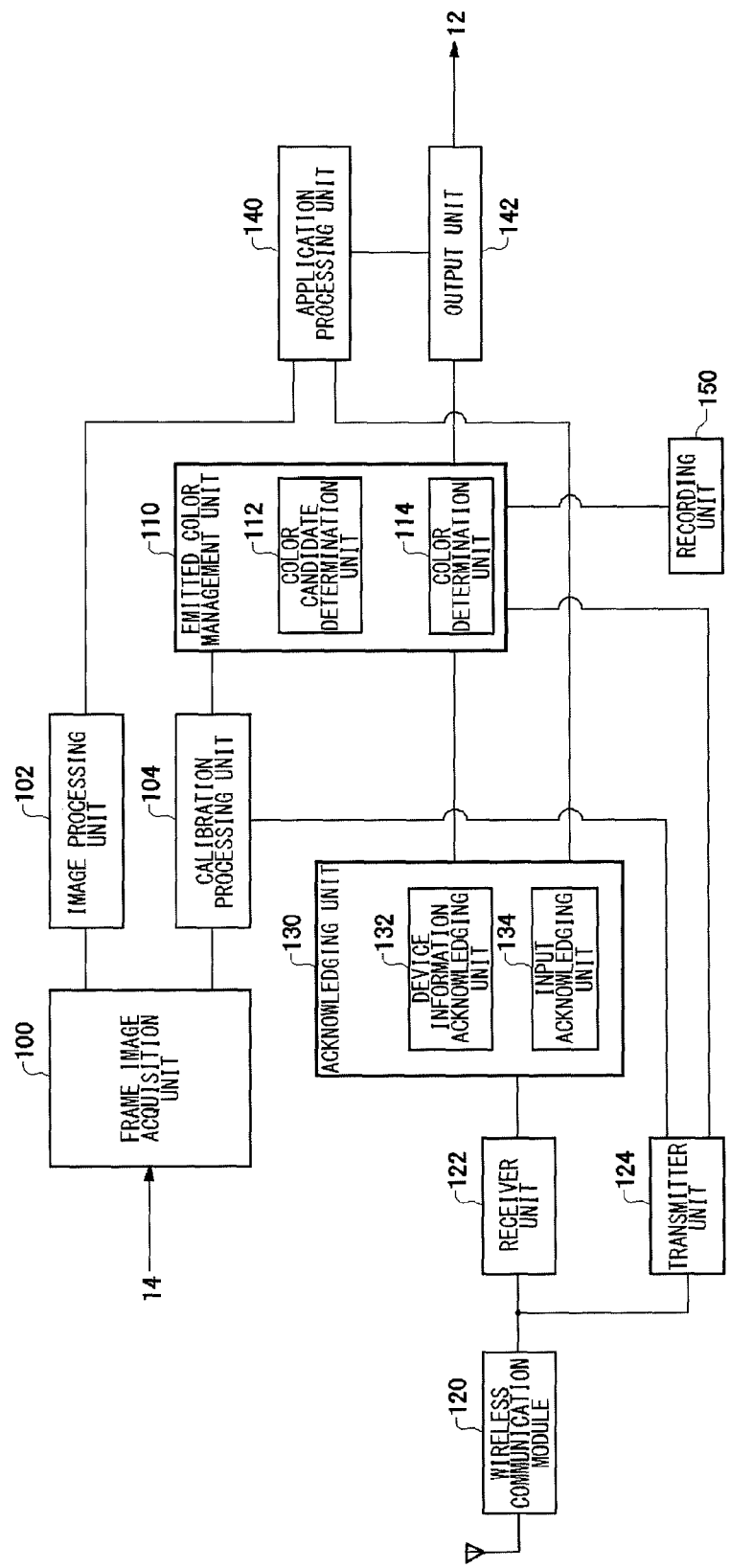
FIG. 4 shows the configuration of the game device.

FIG. 4 shows the configuration of the game device 10. The game device 10 comprises a frame image acquisition unit 100, an image processing unit 102, a calibration processing unit 104, an emitted color management unit 110, a wireless communication module 120, a receiver unit 122, a transmitter unit 124, an acknowledging unit 130, an application processing unit 140, an output unit 142, and a recording unit 150. The emitted color management unit 110 comprises a color candidate determination unit 112 and a color determination unit 114. The acknowledging unit 130 comprises a device information acknowledging unit 132 and an input acknowledging unit 134. The wireless communication module 120 has the function of transmitting and receiving data to and from the wireless communication module 50 of the input device 20. The wireless communication module 120 may comprise the receiver unit 122 and the transmitter unit 124.

The functions of the game device 10 are implemented, in hardware components, by any CPU of a computer, a memory, and a program or the like loaded into the memory. FIG. 4 depicts functional blocks implemented by the cooperation of hardware and software. Therefore, it will be obvious to those skilled in the art that the functional blocks may be implemented in a variety of manners by hardware only, software only, or a combination of thereof.

When the start button 42 of the input device 20 of the information processing system 1 according to the embodiment is pressed, a start request is transmitted to the game device 10, turning the power of the game device 10 on. The wireless communication module 50 calls the game device 10 using the identification information identifying the game device 10. The wireless communication module 120 of the game device 10 responds to the call so that connection is established between the wireless communication module 50 and the wireless communication module 120. The input device 20 operates as a master and the game device 10 operates as a slave. After the connection is established, the devices change roles. As a result of the communication process as described above, information on the status of the control buttons, and information on values detected by the three-axis acceleration sensor 56 and the three-axis gyro sensor 58 can be transmitted to the game device 10 at predetermined intervals.

When the input device 20 calls the game device 10, or at a certain point of time after the connection is established, the transmitter unit 54 of the input device 20 transmits the device information stored in the recording unit 82 to the game device 10. The receiver unit 122 of the game device 10 receives the device information via the wireless communication module 120. When the device information acknowledging unit 132 acknowledges the device information, the unit 132 delivers the acknowledged device information to the emitted color management unit 110. The device information acknowledging unit 132 may temporarily store the device information in a predetermined area in a memory so that the emitted color management unit 110 may acquire the device information from the memory when the information is needed.

The frame image acquisition unit 100 is configured as a USB interface and acquires frame images at a predetermined imaging speed (e.g., 30 frames/sec) from the imaging device 14. In the information processing system 1 according to the embodiment, color calibration of the imaging device 14 is performed before the game is started.

The calibration processing unit 104 generates a light-emission command for calibration. The transmitter unit 124 transmits the command to the input device 20 via the wireless communication module 120. The light-emission command for calibration is information directing the light-emitting unit 62 to emit red, green, blue light in the stated order so that emission of each color lasts for a predetermined period of time. When the light-emission command acknowledging unit 74 in the input device 20 acknowledges a command to emit light, the light-emission control unit 60 controls how the light-emitting unit 62 is lighted in accordance with the emitted color and duration of light emission included in the command.

The recording unit 82 in the input device 20 may store a light-emission pattern for calibration. In this case, the command for light emission transmitted from the transmitter unit 124 may not include information related to emitted color and duration of light emission. When the light-emission command acknowledging unit 74 acknowledges a command for light emission, the light-emission control unit 60 may read the light-emission pattern for calibration from the recording unit 82 and controls how the light-emitting unit 62 is lighted in accordance with the light-emission pattern.

When the frame image acquisition unit 100 acquires a frame image from the imaging device 14, the unit 100 delivers the image to the calibration processing unit 104. The calibration processing unit 104 performs color calibration using frame images picked up as the light-emitting unit 62 is lighted in red, green, and blue in the stated order, thereby adjusting, for example, the gain of the imaging device 14.

Further, the calibration processing unit 104 extracts the environmental color included in the frame image so as to generate an environmental parameter. The environmental color is included in the space imaged by the imaging device 14. The environmental parameter is generated as color information of the environmental color. The color information may be of a format in which R (red), G (green), and B (blue) values of a single pixel are represented by 8 bits each. The calibration processing unit 104 delivers the generated environmental parameter to the color candidate determination unit 112. This completes the color calibration.

A description will now be given of the process performed when an application is run. The emitted color management unit 110 determines the color emitted by the light-emitting unit 62 or facilitates the determination. The color candidate determination unit 112 uses the environmental parameter to determine candidates of emitted color. If the light-emitting unit 62 emits light of the same color as the environmental color, it may be difficult to extract an image of the light-emitting unit 62 from the frame image. In a typical example, it is not easy to distinguish an image of the light-emitting unit 62 from an image of a wall in the frame image, if the light-emitting unit 62 is lighted in red in a room surrounded by red walls. In this respect, the color candidate determination unit 112 preferably determines candidates of emitted color, excluding the color information identified by the environmental parameter. An environmental color occupying only few pixels in a frame image is preferably not included in the environmental parameter. By disregarding the environmental color that does not substantially affect the precision of recognition of an image of the light-emitting unit, it is possible to select from a wider range of candidates of emitted color.

The color determination unit 114 determines the emitted color of the light-emitting body 22 from the candidates of emitted color determined by the color candidate determination unit 112. The recording unit 150 records the color information determined by the color determination unit 114. The color candidate determination unit 112 and the color determination unit 114 may determine the candidates of emitted color and the emitted color by referring to the history of color information recorded in the recording unit 150. The transmitter unit 124 notifies the input device 20 of the color information determined by the color determination unit 114 via the wireless communication module 120. When the color information acknowledging unit 72 in the input device 20 acknowledges the color information from the receiver unit 52, the unit 72 delivers the information to the emitted color management unit 90. The color determination unit 94 determines the delivered color information as the emitted color information of the light-emitting unit 62. The color determination unit 94 delivers the color information to the light-emission control unit 60. The light-emission control unit 60 controls how the light-emitting unit 62 is lighted in accordance with the delivered color information.

The image processing unit 102 in the game device 10 extracts an image of the light-emitting body 22 from the frame image. The image processing unit 102 identifies the position and size of the image of the light-emitting body 22 in the frame image. The image processing unit 102 may binarize the frame image data using a threshold value that depends on the emitted color of the light-emitting unit 62 and generate a binarized image. Binarization encodes pixel values of pixels having luminance higher than a predetermined threshold value into "1" and encodes pixel values of pixels having luminance equal to or lower than the predetermined threshold value into "0". This allows the image processing unit 102 to identify the position and size of the image of the light-emitting body 22 from the binarized image. For example, the image processing unit 102 identifies the barycentric coordinate of the image of the light-emitting body 22 in the frame image and identifies the radius and area of the image of the light-emitting body 22. When multiple users use input devices 20 so that multiple light-emitting bodies 22 are found in the frame image, the image processing unit 102 generates multiple binarized images using threshold values that depend on the emitted color of the respective light-emitting bodies 22, so as to identify the position and size of the images of the respective light-emitting bodies.

The image processing unit 102 derives information on the position of the input device as viewed from the imaging device 14 by referring to the position and size of the image of the light-emitting body 22 thus identified. The image processing unit 102 derives the positional coordinates in the camera coordinate system by referring to the barycentric coordinates of the image of the light-emitting body 22. The unit 102 further derives information on the distance from the imaging device 14 by referring to the radius and area of the image of the light-emitting body 22. The positional information and distance information constitute the positional information of the input device 20. The image processing unit 102 derives the positional information of the input device 20 for each frame image and delivers the information to the application processing unit 140. The application processing unit 140 receives information on the position of the input device 20 as a command to control the game.

The receiver unit 122 receives information on the status of the control buttons and information on values detected by the sensors, which are transmitted by the input device 20, via the wireless communication module 120 and supplies the information to the input acknowledging unit 134. The input acknowledging unit 134 isolates the button status information from the sensor detection information and delivers the information to the application processing unit 140. The application processing unit 140 acknowledges the button status information and the sensor detection information as a command to control the game, respectively. The application processing unit 140 deals the sensor detection information as information on the orientation of the input device 20.

The application processing unit 140 uses the positional information of the input device 20, the orientation information of the input device 20 and button status information to advance the game, and generates an image signal indicating the result of processing the game program. The image signal is sent from the output unit 142 to the display device 12 and output as a displayed image.

The game device 10 of the information processing system 1 reflects the positional information of the light-emitting body 22 in game processing by extracting the light-emitting body 22 of the input device 20 from the image captured by the imaging device 14. For this purpose, the light-emitting body 22 preferably emits light of a color different from the color included in the environmental parameter. This allows the game device 10 to extract the image of the light-emitting body 22 from the captured image with precision.

Meanwhile, the input device 20 comprises the main body 24 held by the user in addition to the light-emitting body 22. Since the main body 24 is adjacent to the light-emitting body 22, the impact of the main body 24 on the precision of recognizing the image of the light-emitting body 22 is not small as the image processing unit 102 extracts the image of the light-emitting body 22 from the frame image. The calibration processing unit 104 extracts the environmental color included in the frame image so as to generate the environmental parameter. Even when the frame image includes the input device 20, the image of the main body 24 may not be included in the frame image depending on the orientation of the input device 20 with respect to the imaging device 14. If the main body 24 is not imaged, the color information of the main body 24 will not be identified as the environmental color. However, since the color of the main body 24 is likely to affect the precision of recognizing the image of the light-emitting body 22, it is preferable to ensure that the color information of the main body 24 is factored in to determine the emitted color.

Additionally, the user may desire to cause the light-emitting body 22 to emit light of a favorite color. For example, when an application allows the user to select an emitted color, the user may cause the light-emitting body 22 to emit light of a favorite color other than the environmental color and play the game accordingly. Normally, the user will select the color next time the user plays the game. If the process of selection can be omitted, the user enjoys the benefit of playing the game immediately. A description will now be given of the process of determining the emitted color in the information processing system 1 in light of the requirements described above. The information processing system 1 supports determination of the emitted color by the game device 10 and determination of the emitted color by the input device 20.

<Determination of the Emitted Color by the Game Device 10>

The device information acknowledging unit 132 of the game device 10 acknowledges the device information of the input device 20. The device information includes the device identification number identifying the input device 20 and the color information of the main body 24 of the input device 20. In this embodiment, the device identification number and the color information of the main body are acknowledged as color identification information for identifying the color information of the main body 24.

The color information of the main body 24 of the input device 20 acknowledged by the device information acknowledging unit 132 directly indicates the color identification information identifying the color information of the main body 24. For example, in case the main body 24 is red, the color information included in the device information indicates red. Meanwhile, even when the device information does not include color information, the game device 10 may acknowledge the device identification information as the color identification information indirectly identifying the color information of the main body 24 by maintaining a table mapping the device identification information of the input device 20 into the color information of the main body 24. When the input device 20 is used initially, the device identification information need to be registered in (paired with) the game device 10. In this process, the user can create a mapping table by registering the color information of the main body 24. When the device information acknowledging unit 132 acknowledges the device identification information, the unit 132 refers to the table and reads the color information, using the device identification information as a key. The device information acknowledging unit 132 delivers the color information of the main body 24 identified by referring to the color identification information to the emitted color management unit 110.

When the color determination unit 114 receives the color information of the main body 24, the color determination unit 114 determines color information different from the color information of the main body 24 as the emitted color of the light-emitting body 22. This allows the image of the light-emitting body 22 to be easily isolated by image processing from the image of the main body 24 in the frame image captured by the imaging device 14.

In this process, the color candidate determination unit 112 may receive the color information of the main body 24 and determine the candidates of emitted color so that the color determination unit 114 may determine the emitted color from the candidates. The color candidate determination unit 112 determines the candidates of emitted color by excluding the color information of the main body 24 from the multiple emitted colors that the light-emitting body 22 can generate. The color candidate determination unit 112 already excludes the color information identified by the environmental parameter from the candidates. The unit 112 determines the candidates of emitted color by further excluding the color information of the main body 24. The candidates of emitted color may directly represent color information identifying the RGB pixel values. Alternatively, the candidates may define limitations in a color template for the user's color selection that prevent the user from selecting the environmental color information and the main body color information. The color determination unit 114 determines the emitted color from the candidates thus narrowed down. The color determination unit 114 may determine the emitted color according to the user command for selection. This allows the image of the light-emitting body 22 to be easily isolated by image processing from the environmental image including the image of the main body in the frame image captured by the imaging device 14. The transmitter unit 124 notifies the input device 20 of the color information determined by the color determination unit 114 via the wireless communication module 120.

Figure 5:
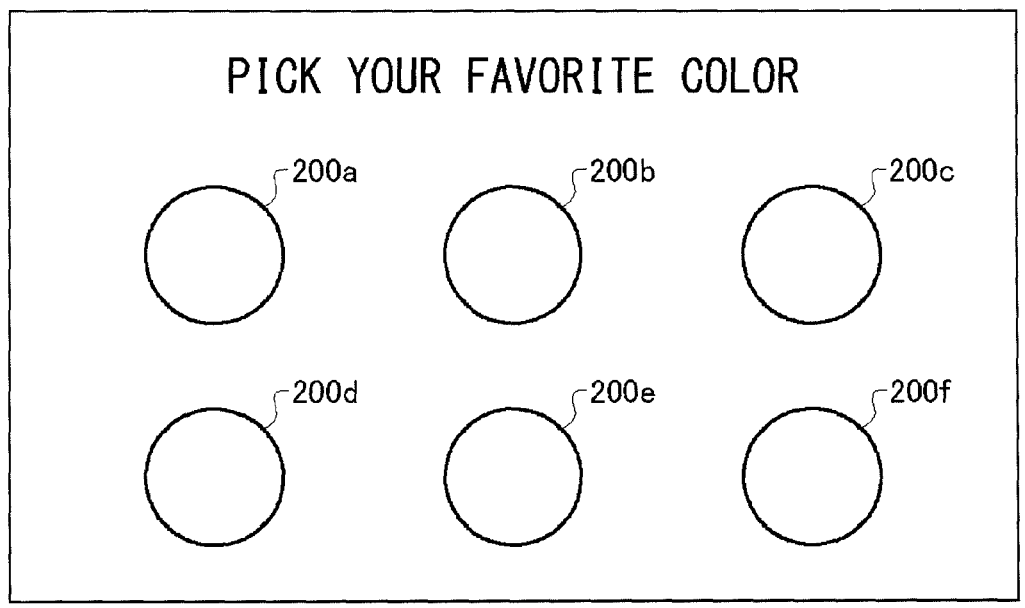
FIG. 5 shows an exemplary screen that presents the candidates of emitted color.

The color candidate determination unit 112 may present the candidates of emitted color thus determined to the user. FIG. 5 shows an exemplary screen that presents the candidates of emitted color. In the display device 12, the candidates of emitted color determined by the color candidate determination unit 112 are shown in colored areas 200a-200f. Each of the colored areas 200a-200f is assigned a candidate color. The user can select one of the colored areas 200 by controlling the input device 20. When the user selects a colored area 200b, for example, the input acknowledging unit 134 acknowledges a user command input via the input device 20 and the color determination unit 114 determines the color information of the colored area 200b as the color information of the light-emitting body 22. By presenting multiple candidates of emitted color, the user can select a favorable color.

When the color determination unit 114 determines the color information and the transmitter unit 124 notifies the input device 20 of the color information, the receiver unit 52 in the input device 20 receives the color information. When the color information acknowledging unit 72 acknowledges the color information and delivers the information to the color determination unit 94, the color determination unit 94 determines the delivered information as the color information of the light-emitting body 22. The light-emission control unit 60 causes the light-emitting unit 62 to emit light according to the color information.

Figure 6:
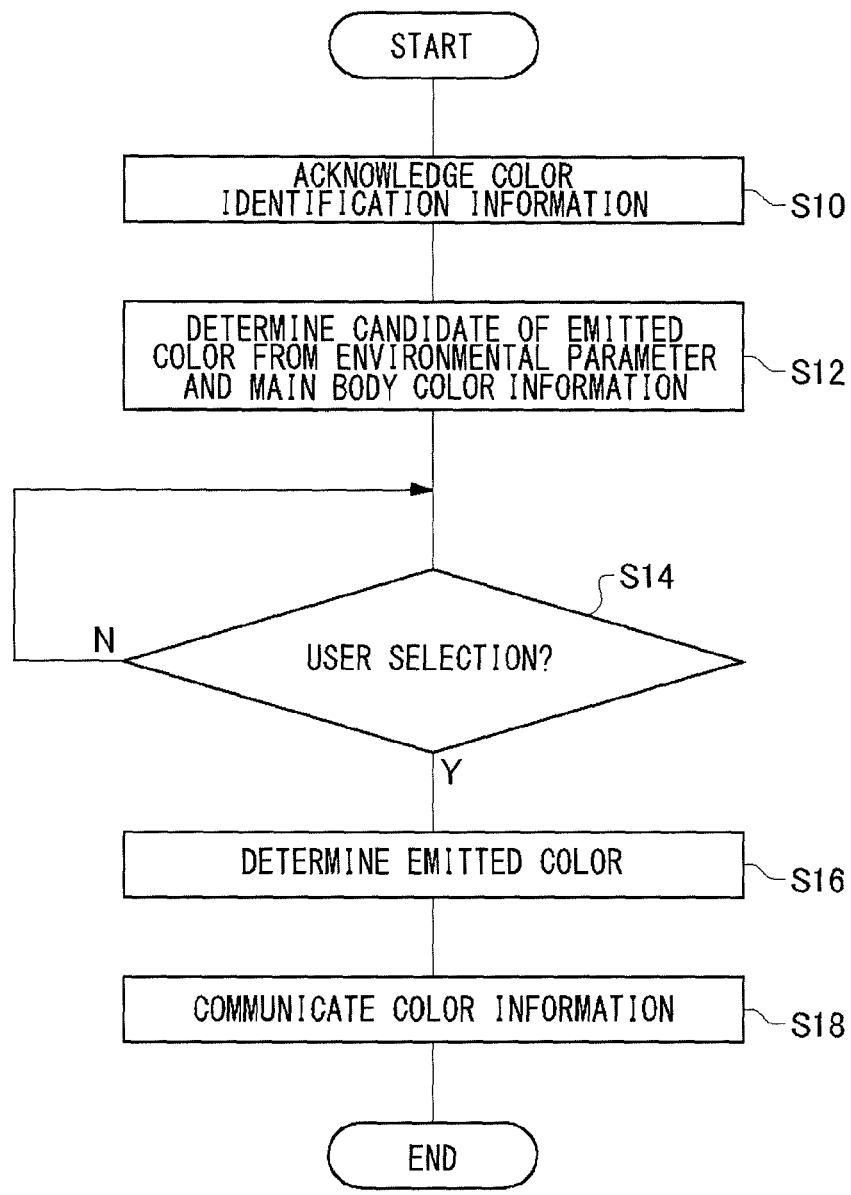
FIG. 6 is a flowchart showing the process of determining the color information.

FIG. 6 is a flowchart showing the process of determining the color information. Referring to the flowchart shown in FIG. 6, the steps in the respective components are denoted by a combination of S (initial letter of Step), which indicates "step", and a numeral. When a determination is made in a step denoted by a combination of S and a numeral and when the result of determination is affirmative, Y (initial letter of Yes) is used to indicate the affirmative determination (e.g., Y in S10). Conversely, when the result of determination is negative, N (initial letter of No) is used to indicate the negative determination (e.g., N in S10). The same convention of notation in the flowchart is observed in the other flowchart.

The device information acknowledging unit 132 acknowledges color identification information for identifying the color information of the body 24 of the input device 20 (S10). The color candidate determination unit 112 determines one or more candidates of emitted color assignable to the light-emitting body 22 by referring to the environmental parameter and the color information of the body 24 (S12). The candidate is presented to the user on the display device 12 (N in S14). When the user selects one of the candidates (Y in S14), the color determination unit 114 determines the selected color information as the color information of the light-emitting body 22 (S16). The transmitter unit 124 notifies the input device 20 of the color information determined by the color determination unit 114 via the wireless communication module 120 (S18).

It will be assumed that another user participates in the middle of the game. The input device already assigned the color information will be referred to as the "first input device 20" and the input device of the user participating in the middle will be referred to as the "second input device 20".

As already described, the second input device 20 in possession of the new user transmits the device information to the game device 10 so that the device information acknowledging unit 132 acquires color information for identifying the color information of the main body 24 of the second input device 20. The device information acknowledging unit 132 delivers the color information of the main body 24 to the emitted color management unit 110.

When the color determination unit 114 receives the color information of the main body 24 of the second input device 20, the unit 114 determines the color information of the light-emitting body 22 of the second input device 20 such that it is different from the color information of the light-emitting body 22 of the first input device 20. This allows the emitted color of the first input device 20 to be different from that of the second input device 20 so that the image processing unit 102 is capable of recognizing the devices, distinguishing the devices from each other.

When the color information of the main body 24 of the second input device 20 indicates the same color as the color information of the light-emitting body 22 of the first input device 20, the color determination unit 114 changes the color information of the light-emitting body 22 of first input device 20. Determination that the colors are the same is yielded not only when the pixel values forming the color information are identical in all RGB channels but also when the values are different but it is difficult for the image processing unit 102 to isolate the colors by filtering. For example, when the color information of the main body 24 of the second input device 20 indicates red, i.e., (R, G, B)=(255, 0, 0), and when the color information of the light-emitting body 22 of the first input device 20 indicates red of a slightly different hue, i.e., (R, G, B)=(254, 0, 0), the color information of the light-emitting body 22 of the first device 20 is changed in this case because it will be difficult for the image processing unit 102 to distinguish between the color information. The threshold value to determine whether the colors are the same or different depends on the environment. The color determination unit 114 determines whether the color information of the main body of the second input device 20 matches the emitted color information of the first input device 20 by maintaining threshold map information that depends on the environment.

The color determination unit 114 may compulsorily change the emitted color information of the first input device 20. Alternatively, the color candidate determination unit 112 may generate a screen presenting the candidates of emitted color so that the user can select a favorite color.

When the color determination unit 114 determines the color information of the light-emitting body 22, the unit 114 records the information in the recording unit 150. Generally, the display device 12 and the imaging device 14 are located in a room so that the arrangement thereof is rarely changed. Therefore, the space imaged by the imaging device 14 does not change significantly so that the environmental parameter does not change significantly from day to day.

Since the color determination unit 114 determines the emitted color information by referring to the environmental parameter, it is highly likely that the emitted color information can also be used next time the user plays the game. Further, the emitted color is determined by user selection and so is the user's favorite color in many cases. In this regard, the color information determined by the color determination unit 114 may be recorded in the recording unit 150 so that the color information recorded in the recording unit 150 is used next time the user plays the game.

For the reason described above, the game device 10 stores the history of color information determined by the color determination unit 114 in the recording unit 150. In this process, the color determination unit 114 records the device identification information identifying the input device 20 and the color information in association with each other. For example, when user A uses the first input device 20 and user B uses the second input device 20, the emitted color used in the past can be assigned to user A next time user A plays the game, by mapping the device identification information of the first input device 20 into the emitted color information and recording the information accordingly. Similarly, the emitted color used in the past can be assigned to user B by mapping the device identification information of the second input device 20 into the emitted color information and recording the information accordingly.

More specifically, when wireless connection is established between the game device 10 and the input device 20, the color determination unit 114 receives the device identification information of the input device 20 from the device information acknowledging unit 132 and acquires the emitted color information recorded in the recording unit 150. Of the emitted color information recorded in the recording unit 150, the color determination unit 114 determines the emitted color information recorded in the immediately previous session, i.e., the emitted color information assigned to the user when the user discontinued the previous play, as the color information of the light-emitting body 22. This allows the emitted color previously selected by the user to be assigned to the user without requiring user selection.

In this process, the color candidate determination unit 112 may use the environmental parameter to determine the candidates of assignable color. The color determination unit 114 may determine the color information if the emitted color information acquired from the recording unit 150 is included in the candidates. This enables assignment of emitted color considering the environmental parameter. If the immediately previous emitted color information recorded in the recording unit 150 cannot be used, a determination as to whether the color can be assigned in the inverse chronological order so as to determine the color information of the light-emitting body 22.

Alternatively, the color candidate determination unit 112 may receive the device identification information of the input device 20 from the device information acknowledging unit 132 when wireless connection is established between the game device 10 and the input device 20. The unit 112 may then refer to the history recorded in the recording unit 150 and acquire multiple items of emitted color information in the reverse chronological order so as to generate a presentation screen shown in FIG. 5. The input acknowledging unit 134 acknowledges a user command to determine the emitted color so that the color determination unit 114 determines the color information on the light-emitting body 22 in accordance with the command for determination. In this way, the user is presented with options of multiple items of color information as well as the color information used in the previous play and is capable of enjoying more opportunities of selecting the emitted color.

Figure 7:
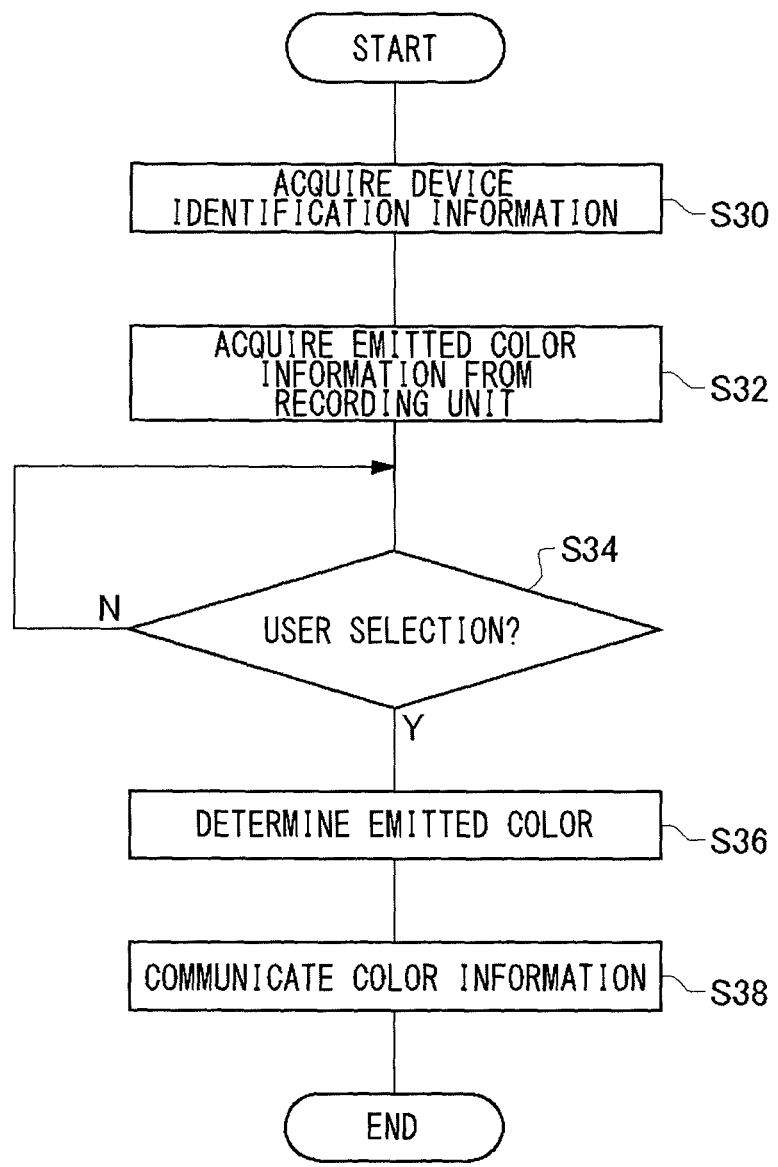
FIG. 7 is a flowchart showing the process of determining color information.

FIG. 7 is a flowchart showing the process of determining color information. The device information acknowledging unit 132 acknowledges device identification information of the input device 20 (S30). When the color candidate determination unit 112 acquires the device identification information of the input device 20 from the device information acknowledging unit 132, the unit 112 refers to the recording unit 150 and acquires multiple emitted color information items from the history mapped into the device identification information and uses the information items as candidates (S32). The candidates are presented to the user on the display device 12 (N in S34). When the user selects one of the candidates (Y in S34), the color determination unit 114 determines the selected color information as the color information of the light-emitting body 22 (S36). The transmitter unit 124 communicates the color information determined by the color determination unit 114 to the input device 20 via the wireless communication module 120 (S38).

Described above is the process of determining the emitted color by the game device. The process of determining the emitted color by the input device 20 will be described below.
<Determination of the Emitted Color by the Input Device 20>

The recording unit 82 in the input device 20 records the history of color information determined by the color determination unit 94. The color determination unit 94 determines the color information acknowledged by the color information acknowledging unit 72 from the game device 10 as the color information of the light-emitting unit 62. Therefore, the recording unit 82 stores the history of color information determined by the game device 10 and the color information determined by the input device 20.

The color determination unit 94 acquires the emitted color information recorded in the recording unit 82. Of the emitted color information recorded in the recording unit 82, the color determination unit 114 determines the emitted color information recorded in the immediately previous session, i.e., the emitted color information assigned to the user when the user discontinued the previous play, as the color information of the light-emitting body 22. This allows the emitted color previously selected by the user to be assigned to the user without requiring user selection.

Alternatively, the color candidate determination unit 92 may acquire multiple items of emitted color information from the history recorded in the recording unit 82 in the reverse chronological order. In this case, the color candidate determination unit 92 delivers the color information to the color determination unit 94 in the reverse chronological order. The color determination unit 94 sends the color information to the light-emission control unit 60. The light-emission control unit 60 causes the light-emitting unit 62 to emit light accordingly.

If the user does not like the emitted color, the user can cancel the emitted color in a simple operation. For example, the user may swing the input device 20 sideways. When the user swings the input device 20 sideways, the sensor information acknowledging unit 78 acknowledges information on values detected by the sensor 84. The internal circuit of the input device 20 or the game device 10 determines that the input device 20 is swung sideways by referring to the detected value information. As the detected value information is communicated to the emitted color management unit 90, the emitted color management unit 90 recognizes that the candidate of emitted color is canceled. The color candidate determination unit 92 delivers the next color information to the color determination unit 94. When the color determination unit 94 sends the color information to the light-emission control unit 60, the light-emission control unit 60 causes the light-emitting unit 62 to emit light. In this way, the user is presented with options of multiple items of color information as well as the color information used in the previous play and is capable of selecting an emitted color easily. If the user likes the emitted color, the user confirms the selection of the emitted color. The selection may be confirmed by the user by, for example, swinging the input device vertically. The emitted color management unit 90 recognizes that the emitted color is determined through the steps as described above.

Described above is an explanation based on an exemplary embodiment. The embodiment is intended to be illustrative only and it will be obvious to those skilled in the art that various modifications to constituting elements and processes could be developed and that such modifications are also within the scope of the present invention.

For example, if the main body 24 is colored in multiple colors, the device information transmitted from the input device 20 to the game device 10 includes color identification information for identifying multiple color information items. Also, when a patterned sticker is pasted to the main body 24, for example, it is favorable that the user directs the game device 10 to register the color information of the sticker in the table that maps the identification information of the input device 20 into the color information of the main body 24. Alternatively, the color information of the sticker may be recorded in the table as the color information of the main body 24.

The environmental parameter is described in the embodiment. The color information that cannot be assigned as the emitted color due to the environmental parameter may be stored in the recording unit 150. The color candidate determination unit 112 and the color determination unit 114 may continue to deal the stored information as unassignable color information that cannot be determined as the emitted color candidate or the emitted color information, respectively. In this case, the color candidate determination unit 112 and the color determination unit 114 determine the emitted color candidate and the emitted color information, respectively, by referring to the current environmental parameter and the unassignable color information as stored. When a change in the arrangement of the display device 12 or the imaging device 14 and an associated substantive change in the environmental parameter are detected, the unassignable color information as stored is preferably deleted from the recording unit 150.

While the input device 20 is not wirelessly connected to the game device 10, the light-emitting unit 62 may emit light in a predetermined pattern. For example, the emitted color may change in accordance with the acceleration with which the input device 20 is swung or the light-emitting unit 62 may be lighted for a predetermined period of time and then extinguished (blinking mode). The user uses a predetermined button to initiate the transition of the input device 20 to the blinking mode.

Referring to FIG. 2, when the control buttons 34 and 36 are pressed simultaneously and the START button (not shown) provided on the side of the main body 24 is pressed, the input device 20 may make a transition to the blinking mode, for example. Return from the blinking mode to the normal mode may be initiated by pressing the START button. Transition from the normal mode to the blinking mode may be prohibited while the input device 20 is wirelessly connected to the game device 10. Wireless connection between the input device 20 and the game device 10 may be prohibited in the blinking mode.

In the blinking mode, the emitted color of the light-emitting body 22 may be configured regardless of the environmental color or the limitation on the color permitted to be used. Alternatively, the input device 20 may acquire the environmental parameter from the game device 10 so that the color determination unit 94 determines the emitted color so as to avoid the environmental color. Thus, the input device 20 can function not only as a device to provide an input to an application but also as an independent device capable of being lighted according to the mode.

Since the input device 20 is driven by a battery, it is preferable to reduce power consumption. For this reason, the input device 20 can make a transition to a power-saving light-emission mode automatically or under the direction from the game device 10. In the power-saving light-emission mode, high-luminance light-emission is avoided. When the light-emitting unit 62 is an LED controlled to emit light in the luminance value range of 0-255, emission at high luminance values is not permitted so that the unit 62 is controlled to emit light in the luminance value range of, for example, 0-127.

The input device 20 has the function of monitoring the available battery level. Upon detecting that the available battery level falls below a predetermined value, the input device 20 may make a transition to the power-saving light-emission mode automatically. In the power-saving light-emission mode, the color determination unit 94 determines whether the emitted color information of the light-emitting unit 62 is within the luminance value range of 0-127. The upper limit of 127 of the luminance values is by way of example only and can be configured arbitrarily. When the luminance value in R, G, or B exceeds the upper limit, the color determination unit 94 determines the color information so that the luminance values in all of the R, G, and B channels are 127 or below so that the hue of the emitted color of the light-emitting unit 62 does not change significantly. For example, by setting the highest luminance value to 127 or below and lowering the other luminance values proportionally, power saving of the input device 20 is achieved without changing the overall hue. This will cause the user to feel that the emitted color of the light-emitting unit 62 is dimmed somewhat. Since the overall hue remains unchanged, however, the user does not feel uncomfortable and can continue to play the game. When the color determination unit 94 determines the emitted color information, the transmitter unit 54 transmits the emitted color information to the game device 10 so as to allow the game device 10 to recognize the image of the light-emitting body 22.

When the input device 20 transmits the information on the available battery level to the game device 10 and the game device 10 detects that the available battery level falls below a predetermined value, the game device 10 may cause the input device 20 to make a transition to the power-saving light-emission mode. The user may select the power-saving light-emission mode for operation of the input device 20. In this case, the game device 10 acknowledges a request for transition to the power-saving light-emission mode from the input device 20 and causes the input device 20 to make a transition to the power-saving mode.

The color determination unit 114 in the game device 10 determines whether the emitted color information of the light-emitting unit 62 falls within the luminance value range of 0-127. When the luminance value in R, G, or B exceeds 128, the color determination unit 114 determines the color information so that the luminance values in all of the R, G, and B channels are 127 or below so that the hue of the emitted color of the light-emitting unit 62 does not change significantly. More specifically, the color determination unit 114 performs the process described as being the process in the color determination unit 94. When the color determination unit 114 determines the emitted color information, the transmitter unit 124 transmits the emitted color information to the input device 20.

What is claimed is:

1. An information processing device comprising: a color determination unit configured to determine color information of a light-emitting body of an input device; a communication unit configured to communicate the determined color information to the input device; an acquisition unit configured to acquire a captured image of the input device; an image processing unit configured to extract an image of the light-emitting body from the captured image of the input device; and a recording unit configured to record the color information determined by the color determination unit.

2. The information processing device according to claim 1, wherein the recording unit records a history of the determined color information.

3. The information processing device according to claim 1, wherein the recording unit records device identification information identifying the input device with the color information.

4. The information processing device according to claim 1, further comprising: a color candidate determination unit configured to determine one or more candidates of emitted color of the light-emitting body, using the color information recorded in the recording unit; and an acknowledging unit configured to acknowledge from the user a command to determine a candidate of emitted light, wherein the color determination unit determines the color information of the light-emitting body in accordance with the command acknowledged in the acknowledging unit.

5. The information processing device according to claim 1, wherein the color determination unit determines the color information of the light-emitting body, using the color information recorded in the recording unit.

6. The information processing device according to claim 5, wherein the color determination unit determines the color information recorded in the recording unit and determined by the color determination unit previously as the color information currently used.

7. A device comprising: a light-emitting body; a light-emission control unit configured to control light emission of the light-emitting body; a color determination unit configured to determine color information of the light-emitting body; and a recording unit configured to record a history of the determined color information, wherein the color determination unit determines the color information of the light-emitting body, using the color information recorded in the recording unit.

8. The device according to claim 7, further comprising: a color candidate determination unit configured to determine one or more candidates of emitted color of the light-emitting body, using the color information recorded in the recording unit, wherein the color determination unit determines the color information of the light-emitting body, using the candidates determined by the color candidate determination unit.

9. The device according to claim 7, wherein the color determination unit determines the color information recorded in the recording unit and determined by the color determination unit previously as the color information currently used.

10. The device according to claim 7, wherein the light-emitting body of the device emits light according to the color information determined by the color determination unit in order to be extracted from the captured image of the input device.

11. An information processing system provided with an information processing device and an input device, wherein the input device comprises: a light-emitting body; and a light-emission control unit configured to control light emission of the light-emitting body, wherein the information processing device comprises: a color determination unit configured to determine color information of a light-emitting body of an input device; a communication unit configured to communicate the determined color information to the input device; and a recording unit configured to record the color information determined by the color determination unit, wherein the color determination unit determines the color information of the light-emitting body, using the color information recorded in the recording unit.

* * * * *